(12) United States Patent
Dowling

(10) Patent No.: US 6,464,438 B1
(45) Date of Patent: Oct. 15, 2002

(54) CAPTIVE FASTENER DEVICE

(75) Inventor: Timothy Edward Dowling, Huntsville, AL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/928,017

(22) Filed: Aug. 9, 2001

(51) Int. Cl.[7] .................. F16B 21/18; F16B 39/00; F16B 43/02
(52) U.S. Cl. ............ 411/107; 411/353; 411/372.6; 411/544; 411/999
(58) Field of Search ................ 411/107, 352, 411/353, 372.5, 372.6, 374, 544, 552, 999

(56) References Cited

U.S. PATENT DOCUMENTS

| 2,921,616 | A |   | 1/1960  | Threewit         |         |
|-----------|---|---|---------|------------------|---------|
| 4,616,967 | A |   | 10/1986 | Molina           |         |
| 4,801,232 | A | * | 1/1989  | Hempel           | 411/552 |
| 5,336,028 | A |   | 8/1994  | Yamamoto         |         |
| 5,338,139 | A |   | 8/1994  | Swanstrom        |         |
| 5,382,124 | A |   | 1/1995  | Frattarola       |         |
| 5,611,654 | A |   | 3/1997  | Frattarola et al.|         |
| 5,642,972 | A |   | 7/1997  | Ellis et al.     |         |
| 5,688,093 | A | * | 11/1997 | Bowers           | 411/544 X |
| 5,743,692 | A |   | 4/1998  | Schwarz          |         |
| 6,074,146 | A |   | 6/2000  | Soemer           |         |
| 6,086,480 | A |   | 7/2000  | Ellis et al.     |         |
| 6,227,784 | B1| * | 5/2001  | Antoine et al.   | 411/544 X |

* cited by examiner

*Primary Examiner*—Neill Wilson
(74) *Attorney, Agent, or Firm*—James J. McGroary

(57) ABSTRACT

A captive fastener device is utilized to hold two members together. The device is comprised of a housing which may be securely attached to the first member. Within the housing is a spring which biases a bottom of a first lip of a cup washer. The top of the first lip contacts the top of the housing when the fastener is not engaged. The fastener has a ledge at the bottom of the fastener head which rests on a top surface of a second lip of the cup washer. The bottom surface of the second lip contacts the first member when the fastener has fully engaged the second member to secure the first and second members together. The first lip of the cup washer has a greater diameter than the second lip. The first lip also has a greater diameter than the fastener. When the fastener is not engaged, a top surface of the first lip engages a bottom surface of the top of the housing. The housing top has an access hole of smaller diameter than the outer diameter of the fastener head which retains the fastener within the housing when the fastener is not engaging the second member.

20 Claims, 1 Drawing Sheet

CAPTIVE FASTENER DEVICE

ORIGIN OF THE INVENTION

This invention was made by an employee of the United States Government and may be manufactured and used by or for the government for governmental purposes without the payment of any royalties thereon or thereof.

BACKGROUND OF THE INVENTION

1. Field of the Invention

This invention relates to a fastener device, and more specifically, to a device that can capture and hold a standard internally wrenched fastener without requiring a specially configured fastener.

2. Prior Art

Various captive fasteners are known in the art including those illustrated and described in U.S. Pat. Nos. 6,086,480, 6,074,146, 5,743,692, 5,642,972, 5,611,654, 5,382,124, 5,338,139, 5,336,028, 4,616,967, and 2,921,616. These designs typically include a specially prepared fastener held captive by a threaded bushing. This arrangement requires the diameter of the fastener under the head to be reduced in order for the head to have adequate contact with the bushing. This reduction in diameter is believed to result in an undesirable strength reduction.

The traditional captive fastener devices are not constructed with off-the-shelf components, especially the threaded fastener portion. Secondly, the traditional captive fastener device has a spring which terminates under a lip of the head of the fastener. Accordingly, either the housing extends the distance of the head of the fastener in addition to the length of the spring, or the housing terminates at the lip of the head of the fastener. In both configurations, the assembly extends the length of the spring AND the length of the head of the fastener. Furthermore, prior art captive fastener devices are not able to utilize springs having diameters greater than the diameter of the head of the fastener.

A need exists for a cost effective captive fastener device which may utilize standard fasteners.

Another need exists for a captive fastener device design which may be relatively easily assembled.

A further need exists for a captive fastener device that can utilize springs having an inner diameter which is greater than the diameter of the fastener.

SUMMARY OF THE INVENTION

Consequently, it is a primary object of the present invention to provide a captive fastener device which may utilize a standard fastener.

Another primary object of the present invention is the ability to utilize springs of larger diameters than the fastener.

Accordingly, the present invention provides a captive fastener device for holding two members together. The device is comprised of a housing which may be securely attached to the first member. Within the housing is a spring which biases a bottom of a first lip of a cup washer. The top of the first lip contacts the top of the housing when the fastener is not engaged. The fastener has a lip at the bottom of the fastener head which rests on a top surface of a second lip of the cup washer. The bottom of the second lip contacts the first member when the fastener has fully engaged the second member to secure the first and second members together. The first lip of the cup washer has a greater diameter than the second lip.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
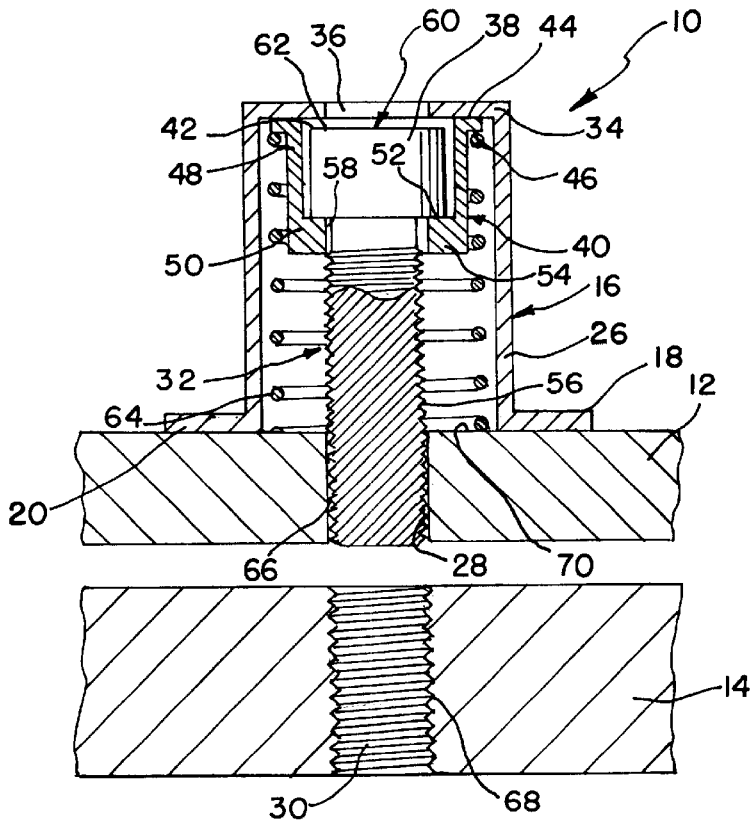
FIG. 1 is a cutaway side view of a captive fastener device for use in securing two members together illustrated in an detached position.
Figure 2:
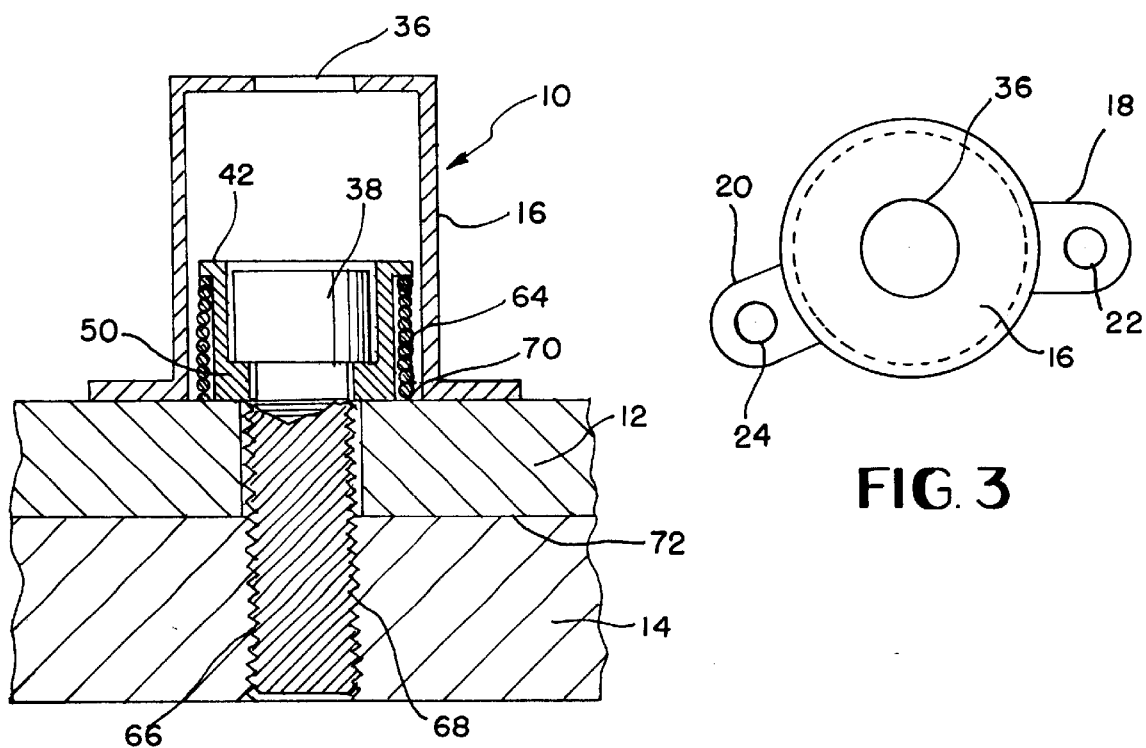
FIG. 2 is a cutaway side view of a captive fastener device for use in securing two members together illustrated in an attached position.

Referring to FIGS. 1 and 2, a captive fastener device 10 for connecting a first and a second member 12, 14 together. First and second members may be planar, as illustrated, or any other appropriate configuration in which a captive fastener device 10 may be utilized. Captive fastener devices 10 are often utilized to retain a panel over a piece of equipment. The captive fastener device allows for relatively easy assembly and disassembly without the worry of lost fasteners since the fastener remains in the captive fastener device 10.

Figure 3:
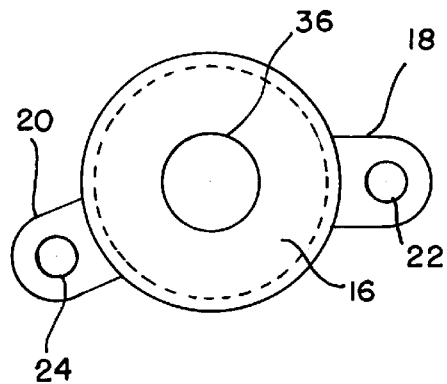
FIG. 3 is a top elevational view of the housing of the captive fastener device of FIGS. 1 and 2.

The captive fastener device 10 is comprised of a housing 16 which may be attached at flanges 18, 20 to the first member 12. As shown in FIG. 3, the flanges 18,20 may contain bores 22,24 to allow at least one fastener, such as a rivet, bolt, screw or other connector to connect the housing 16 to the first member 12. The flanges 18, 20 illustrated are integrally formed as a part of the housing 16.

Referring back to FIG. 1, the housing is preferably cylindrical in shape having a wall 26 forming a cylinder shape. The wall 26 extends away from the first member 12 parallel to bores 28,30 in the first and second members 12,14. It is the bores 28,30 which allow a fastener 32 to extend through to connect the first to the second members 12,14.

The housing 16 also has a top 34. The top of the housing 16 extends inwardly from the wall 26 as shown in FIGS. 1–3. An access hole 36 shown in FIG. 3 allows an operator, such as an alien wrench, screw driver, etc . . . to be inserted into the head 38 of the fastener 32 to operate the fastener 32 to secure and release the first and second members 12,14 from one another. In FIG. 3, the top 34 is substantially circular with a center cutout for the access hole 36. The top 34 is connected to the wall 26.

Before mounting the housing 16 to the first member 12, a washer, such as cup washer 40 is placed within the housing 16 with the fastener 32 extending there through. The cup washer has a first lip 42 having an upper and lower surface 44,46. A washer wall 48 connects the first lip 42 to a second lip 50. The second lip also has an upper and a lower surface 52,54. Standard fasteners 32 are equipped with a head 38 which allows an operator to rotate the fastener 32. The head 38 of most fasteners 32 has a larger diameter than the shank 56 of the fastener 32. Accordingly, a ledge 58 is formed where the head 38 joins the shank 56. The ledge 58 has a larger diameter than an inner diameter of the second lip 50. Accordingly, the ledge 58 will rest on the upper surface 52 of the second lip 50.

The head 38 of the fastener 32 is located between the washer wall 48 in the illustrated embodiment. The first lip 42 is preferably located a distance above the second lip 50. This allows the first lip 42 to be located above the ledge 58, and preferably proximate to a top surface 60 of the head 38 of the fastener 32. This configuration allows the top surface 60 of the fastener head 38 to be proximate to a lower surface 62 of the housing top 34 when the fastener shank 56 is not connecting the first member 12 to the second member 14 as illustrated in FIG. 1.

Spring 64, such as a compression spring, biases the cup washer 40 in the position shown in FIG. 1. The spring 64 exerts a force upwards from the first member 12 towards the cup washer 40. The spring 64 contacts the bottom surface 46 of the first lip 42. The top surface 44 of the cup washer 40 contacts the lower surface 62 of the top 34 when the fastener is not engaged in the second member 14 as illustrated in FIG. 1, i.e., in the disengaged position.

Accordingly, the first lip 42 has a greater diameter than the central opening 36 of the housing top 34, and a larger diameter than the diameter of the spring 64. The spring 64 has a larger diameter than the washer wall 48 and the second lip 50. The spring 64 also has a larger diameter than the head 38 and the shank 56 of the fastener 32. Although the wall 26 of the housing 16 is illustrated as completely surrounding the spring 64, washer 40 and fastener 32, this is not necessary in all embodiments.

FIG. 2 illustrates an engaged position where the fastener shank 56 has engaged the second member, 14. The fastener shank 56 has threads 66 which engage threads 68 on an interior surface of the second member bore 30 in the engaged position. To connect the first and second members 12, 14, an operator would be extended through the access hole 36 into the fastener head 38 and push the fastener 32 towards the second bore 30 against the bias of the spring 64 since the cup washer 40 acts on the fastener 32 as illustrated and explained above. The fastener 32 is illustrated as extending along an axis perpendicular to the first and second numbers 12, 14. The fastener head 38 would be twisted for the threads 66,68 to engage. After sufficient twisting, the bottom surface 54 of the second lip 50 would contact a top surface 70 of the first member 12 and the first and second members 12,14 would meet along a separation plane. This securely connects the first member 12 to the second member 14 through the fastener 32.

To release the first member 12,14, the fastener is unscrewed from the second member 14. When the threads 66,68 disengage, the spring 64 biases the washer 40 and fastener 32 as illustrated in FIG. 1.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A connector for use in joining a first and second member to one another comprising:

a fastener having a head connected to a shank, the shank having a smaller diameter than the head;

a washer having a first and a second lip, the second lip having an upper surface contacting the head;

a spring adapted to contact the first lip of the washer, said spring having a greater diameter than the head of the fastener; and a housing having a wall at least partially surrounding the spring and fastener, said housing having a top with an access hole, said top retaining the fastener, the washer and the spring within the housing when in a disengaged position.

2. The connector of claim 1 wherein the housing wall completely surrounds the washer, the fastener and the spring.

3. The connector of claim 1 wherein the housing further comprises at least one flange, said flange providing a connection location to securely join the connector to the first member.

4. The connector of claim 1 wherein the fastener extends along an axis perpendicular to the first member.

5. The connector of claim 1 wherein the washer is a cup washer.

6. The connector of claim 1 wherein the fastener extends along an axis and the washer further comprises a washer wall extending parallel with the fastener axis.

7. The connector of claim 1 wherein the access hole of the top has a small diameter than the head of the fastener.

8. A connector for use in joining a first and second member to one another comprising:

a fastener having a head connected to a threaded shank;

a washer having a first and a second lip, the second lip having an upper surface contacting the head of the fastener;

a spring adapted to contact the first lip of the washer, said spring having a greater diameter than the head of the fastener; and a housing having a wall at least partially surrounding the spring and fastener, said housing having a top with an access hole, said top retaining the fastener, the washer and the spring within the housing when in a disengaged position.

9. The connector of claim 8 wherein the fastener extends along an axis perpendicular to the first member.

10. The connector of claim 8 wherein the washer is a cup washer.

11. The connector of claim 8 wherein the fastener extends along an axis and the washer further comprises a washer wall extending parallel with the fastener axis.

12. The connector of claim 8 wherein the access hole of the top has a small diameter than the head of the fastener.

13. The connector of claim 8 wherein the housing wall completely surrounds the washer, the fastener and the spring.

14. The connector of claim 8 wherein the housing further comprises at least one flange, said flange providing a connection location to securely join the connector to the first member.

15. A connector for use in joining a first and second member to one another comprising:

a fastener having a head connected to a shank at a ledge;

a washer having a first upper surface contacting the head of the fastener at the ledge;

a spring adapted to contact a lower surface of the washer;

a housing having a wall at least partially surrounding the spring and fastener, said housing having a top with an access hole, said top retaining the fastener, the washer and the spring within the housing when in a disengaged position.

16. The connector of claim 15 wherein the fastener extends along an axis perpendicular to the first member.

17. The connector of claim 15 wherein the washer is a cup washer.

18. The connector of claim 15 wherein the fastener extends along an axis and the washer further comprises a washer wall extending parallel with the fastener axis.

19. The connector of claim 15 wherein the access hole of the top has a small diameter than the head of the fastener.

20. The connector of claim 15 wherein the housing wall completely surrounds the washer, the fastener and the spring.

* * * * *